US009111252B1

(12) United States Patent
Huang et al.

(10) Patent No.: US 9,111,252 B1
(45) Date of Patent: Aug. 18, 2015

(54) PRODUCT INFORMATION UPDATE APPARATUS

(71) Applicant: Jogtek Corp., Taipei (TW)

(72) Inventors: Wei-Chun Huang, Taipei (TW); Tsung-Hsing Hsieh, Taipei (TW)

(73) Assignee: JOGTEK CORP., Taipei (TW)

( * ) Notice: Subject to any disclaimer, the term of this patent is extended or adjusted under 35 U.S.C. 154(b) by 0 days.

(21) Appl. No.: 14/473,501

(22) Filed: Aug. 29, 2014

(51) Int. Cl.
  *G06Q 10/08* (2012.01)
  *G06K 7/10* (2006.01)
  *G06K 17/00* (2006.01)

(52) U.S. Cl.
  CPC .............. *G06Q 10/087* (2013.01); *G06Q 10/08* (2013.01); *G06K 7/10386* (2013.01); *G06K 17/00* (2013.01)

(58) Field of Classification Search
  CPC . G06Q 10/087; G06Q 10/08; G06K 7/10386; G06K 17/00
  See application file for complete search history.

(56) References Cited

U.S. PATENT DOCUMENTS

| | | | |
|---|---|---|---|
| 2007/0159298 A1* | 7/2007 | Zegelin et al. | 340/5.91 |
| 2010/0177750 A1* | 7/2010 | Essinger et al. | 370/338 |
| 2011/0289023 A1* | 11/2011 | Forster et al. | 705/500 |
| 2012/0126982 A1* | 5/2012 | Lee et al. | 340/572.1 |
| 2012/0326849 A1* | 12/2012 | Relihan et al. | 340/10.6 |

* cited by examiner

*Primary Examiner* — Kristy A Haupt
(74) *Attorney, Agent, or Firm* — Chun-Ming Shih; HDLS IPR Services

(57) ABSTRACT

An ultra-high frequency radio frequency identification reader-writer wirelessly sends a product information signal to an ultra-high frequency antenna. The ultra-high frequency antenna sends the product information signal to an ultra-high frequency side dual interface memory unit. The ultra-high frequency side dual interface memory unit utilizes an energy of the product information signal to update a product data corresponding to the product information signal. When a processing unit and a high frequency side dual interface memory unit are driven, the processing unit fetches the product information signal from the ultra-high frequency side dual interface memory unit. The processing unit sends the product information signal to the high frequency side dual interface memory unit. The high frequency side dual interface memory unit updates the product data corresponding to the product information signal.

10 Claims, 5 Drawing Sheets

PRODUCT INFORMATION UPDATE APPARATUS

FIELD OF THE INVENTION

The present invention relates to an update apparatus, and especially relates to a product information update apparatus.

DESCRIPTION OF THE RELATED ART

The electronic paper is a great invention. Unlike the conventional display devices, the electronic paper is very light and thin, and is able to bend (namely, flexible). Changing the contents of the electronic paper will need power, but when there is no power for the electronic paper, the electronic paper still can display the original contents for several months. The electronic papers are used widely, for example the electronic shelf label system. The electronic shelf label system can save a lot of papers and labor cost.

ZigBee or other wireless technologies could change the display contents of the electronic shelf label (for example, the description of the goods, or price of the goods). But maintaining the equipment and software of the wireless technologies for changing the display contents of the electronic shelf label will require a lot of man power and cost. Moreover, the wireless technologies mentioned above could not accurately locate the electronic shelf label which is required to change the display contents (especially the upper shelf and the lower shelf at the same location). Therefore, it will induce the mistake changing the display contents of the electronic shelf label incorrectly.

SUMMARY OF THE INVENTION

In order to solve the above-mentioned problems, an object of the present invention is to provide a product information update apparatus.

In order to achieve the object of the present invention mentioned above, the product information update apparatus is applied to an ultra-high frequency radio frequency identification reader-writer and a handheld apparatus. The product information update apparatus comprises an ultra-high frequency antenna, an ultra-high frequency side dual interface memory unit, a processing unit, a high frequency side dual interface memory unit and a high frequency antenna. The ultra-high frequency antenna is wirelessly electrically connected to the ultra-high frequency radio frequency identification reader-writer. The ultra-high frequency side dual interface memory unit is electrically connected to the ultra-high frequency antenna. The processing unit is electrically connected to the ultra-high frequency side dual interface memory unit. The high frequency side dual interface memory unit is electrically connected to the processing unit. The high frequency antenna is electrically connected to the high frequency side dual interface memory unit. The high frequency antenna is wirelessly electrically connected to the handheld apparatus. The ultra-high frequency radio frequency identification reader-writer wirelessly sends a product information signal to the ultra-high frequency antenna. The ultra-high frequency antenna sends the product information signal to the ultra-high frequency side dual interface memory unit. The ultra-high frequency side dual interface memory unit utilizes an energy of the product information signal to update a product data corresponding to the product information signal. When the processing unit and the high frequency side dual interface memory unit are driven, the processing unit fetches the product information signal from the ultra-high frequency side dual interface memory unit. The processing unit sends the product information signal to the high frequency side dual interface memory unit. The high frequency side dual interface memory unit updates the product data corresponding to the product information signal.

Moreover, the product information update apparatus mentioned above further comprises a display unit electrically connected to the processing unit. When the processing unit and the high frequency side dual interface memory unit are driven, the processing unit fetches the product information signal from the high frequency side dual interface memory unit. The processing unit sends the product information signal to the display unit. The display unit displays an updated product data according to the product information signal.

Moreover, the product information update apparatus mentioned above further comprises a driving power supply unit electrically connected to the processing unit and the high frequency side dual interface memory unit. The driving power supply unit drives the processing unit and the high frequency side dual interface memory unit.

Moreover, the display unit is, for example but not limited to, an electrophoretic display.

Moreover, the display unit is, for example but not limited to, a dot matrix electrophoretic display.

Moreover, the driving power supply unit is, for example but not limited to, a solar energy conversion supply circuit.

Moreover, the product information update apparatus mentioned above further comprises a display driving unit electrically connected to the processing unit and the display unit. The processing unit is configured to control the display driving unit to drive the display unit to update and display the product information signal according to the product information signal.

Moreover, the product information update apparatus mentioned above further comprises a boost unit electrically connected to the processing unit, the high frequency side dual interface memory unit and the driving power supply unit.

Moreover, the display driving unit is, for example but not limited to, a dot matrix electrophoretic display driver. The boost unit is, for example but not limited to, a boost circuit.

Moreover, the processing unit is, for example but not limited to, a microprocessor or a microcontroller.

The efficiency of the present invention is to provide the product information update apparatus, so that updating product information is more easy, convenient and accurate.

DETAILED DESCRIPTION OF THE INVENTION

Figure 1:
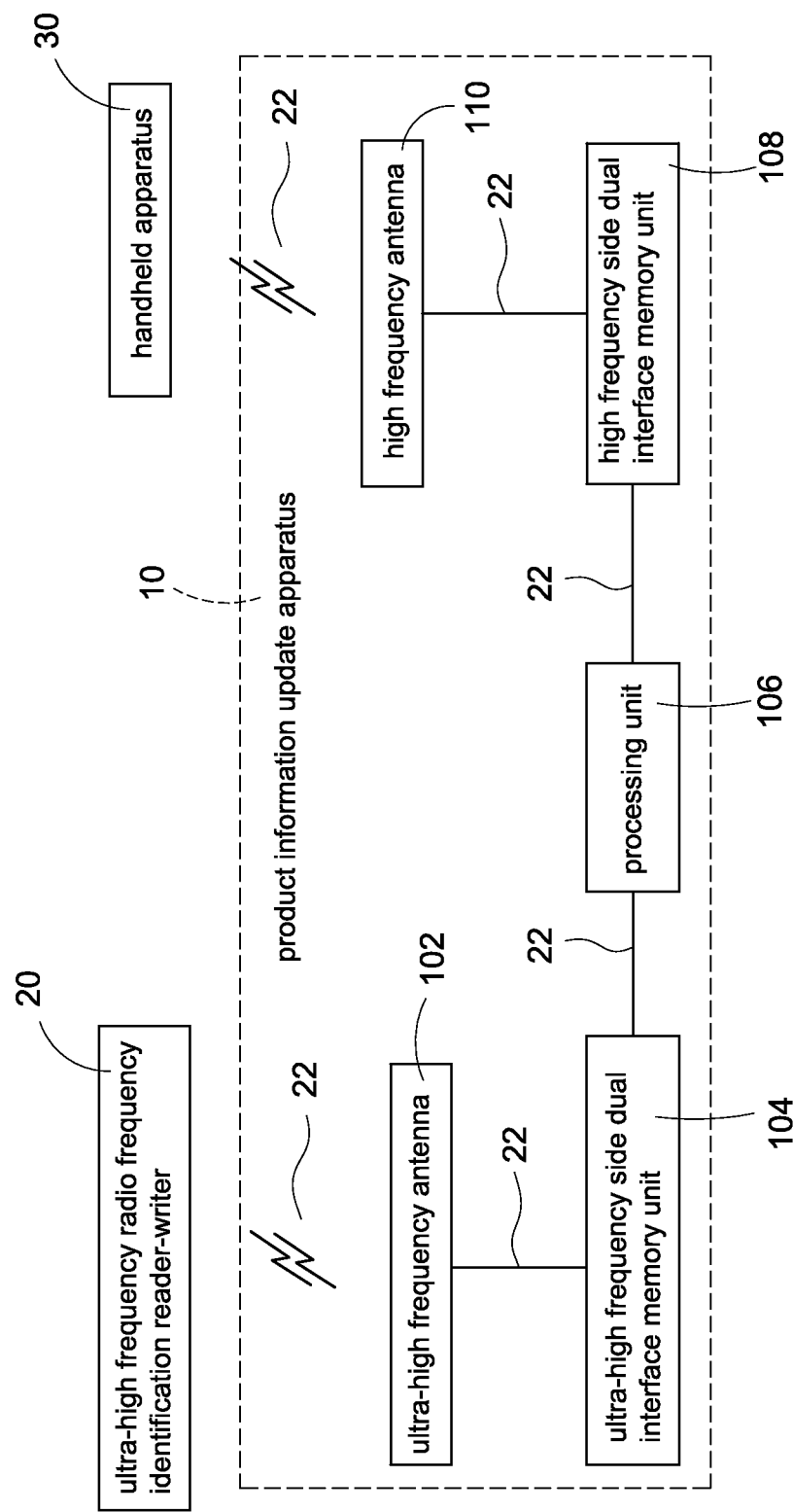
FIG. 1 shows a block diagram of the first embodiment of the product information update apparatus of the present invention.

FIG. 1 shows a block diagram of the first embodiment of the product information update apparatus of the present invention. A product information update apparatus 10 is applied to an ultra-high frequency radio frequency identification reader-writer 20 and a handheld apparatus 30. The product information update apparatus 10 comprises an ultra-high frequency antenna 102, an ultra-high frequency side dual interface memory unit 104, a processing unit 106, a high frequency side dual interface memory unit 108 and a high frequency antenna 110.

The ultra-high frequency antenna 102 is wirelessly electrically connected to the ultra-high frequency radio frequency identification reader-writer 20. The ultra-high frequency side dual interface memory unit 104 is electrically connected to the ultra-high frequency antenna 102. The processing unit 106 is electrically connected to the ultra-high frequency side dual interface memory unit 104. The high frequency side dual interface memory unit 108 is electrically connected to the processing unit 106. The high frequency antenna 110 is electrically connected to the high frequency side dual interface memory unit 108. The high frequency antenna 110 is wirelessly electrically connected to the handheld apparatus 30.

The ultra-high frequency radio frequency identification reader-writer 20 wirelessly sends a product information signal 22 to the ultra-high frequency antenna 102. The ultra-high frequency antenna 102 sends the product information signal 22 to the ultra-high frequency side dual interface memory unit 104. The ultra-high frequency side dual interface memory unit 104 utilizes an energy of the product information signal 22 to update a product data corresponding to the product information signal 22.

When the processing unit 106 and the high frequency side dual interface memory unit 108 are driven, the processing unit 106 fetches the product information signal 22 from the ultra-high frequency side dual interface memory unit 104. The processing unit 106 sends the product information signal 22 to the high frequency side dual interface memory unit 108. The high frequency side dual interface memory unit 108 updates the product data corresponding to the product information signal 22.

Figure 2:
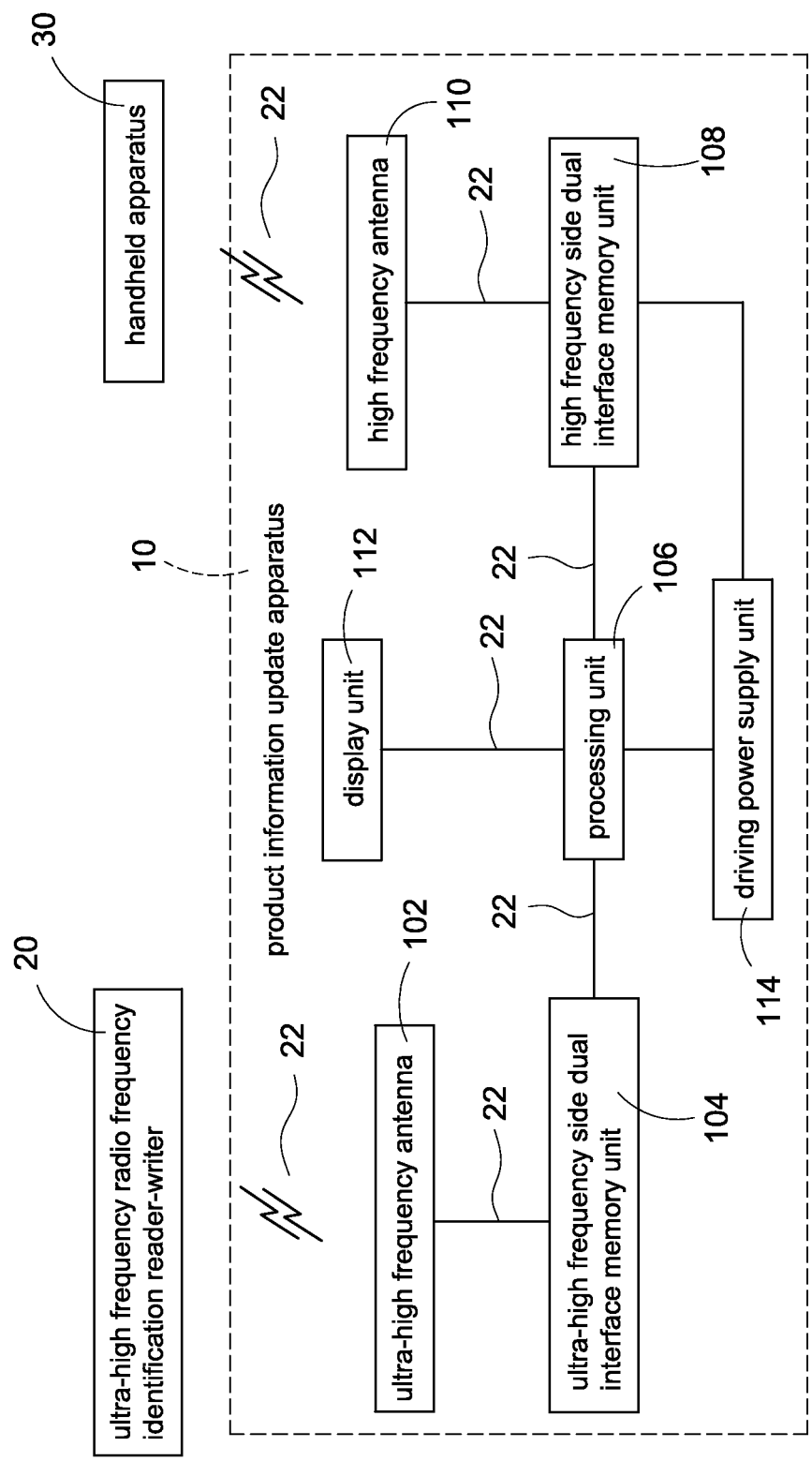
FIG. 2 shows a block diagram of the second embodiment of the product information update apparatus of the present invention.

FIG. 2 shows a block diagram of the second embodiment of the product information update apparatus of the present invention. The description for the elements shown in FIG. 2, which are similar to those shown in FIG. 1, is not repeated here for brevity. Moreover, the product information update apparatus 10 further comprises a display unit 112 and a driving power supply unit 114. The display unit 112 is electrically connected to the processing unit 106. The driving power supply unit 114 is electrically connected to the processing unit 106 and the high frequency side dual interface memory unit 108.

When the processing unit 106 and the high frequency side dual interface memory unit 108 are driven, the processing unit 106 fetches the product information signal 22 from the high frequency side dual interface memory unit 108. The processing unit 106 sends the product information signal 22 to the display unit 112. The display unit 112 displays an updated product data according to the product information signal 22. For example, the original price of the product is 10 dollars, and then the price will be changed to 15 dollars.

In another word, the processing unit 106 fetches the product information signal 22 from the ultra-high frequency side dual interface memory unit 104, and then the processing unit 106 sends the product information signal 22 to the high frequency side dual interface memory unit 108 to update the product data corresponding to the product information signal 22. Then, the processing unit 106 fetches the product information signal 22 from the high frequency side dual interface memory unit 108, and then the processing unit 106 sends the product information signal 22 to the display unit 112 to update and display the product information signal 22.

The driving power supply unit 114 drives the processing unit 106 and the high frequency side dual interface memory unit 108. The display unit 112 is, for example but not limited to, an electrophoretic display or a dot matrix electrophoretic display. The driving power supply unit 114 is, for example but not limited to, a solar energy conversion supply circuit.

Figure 3:
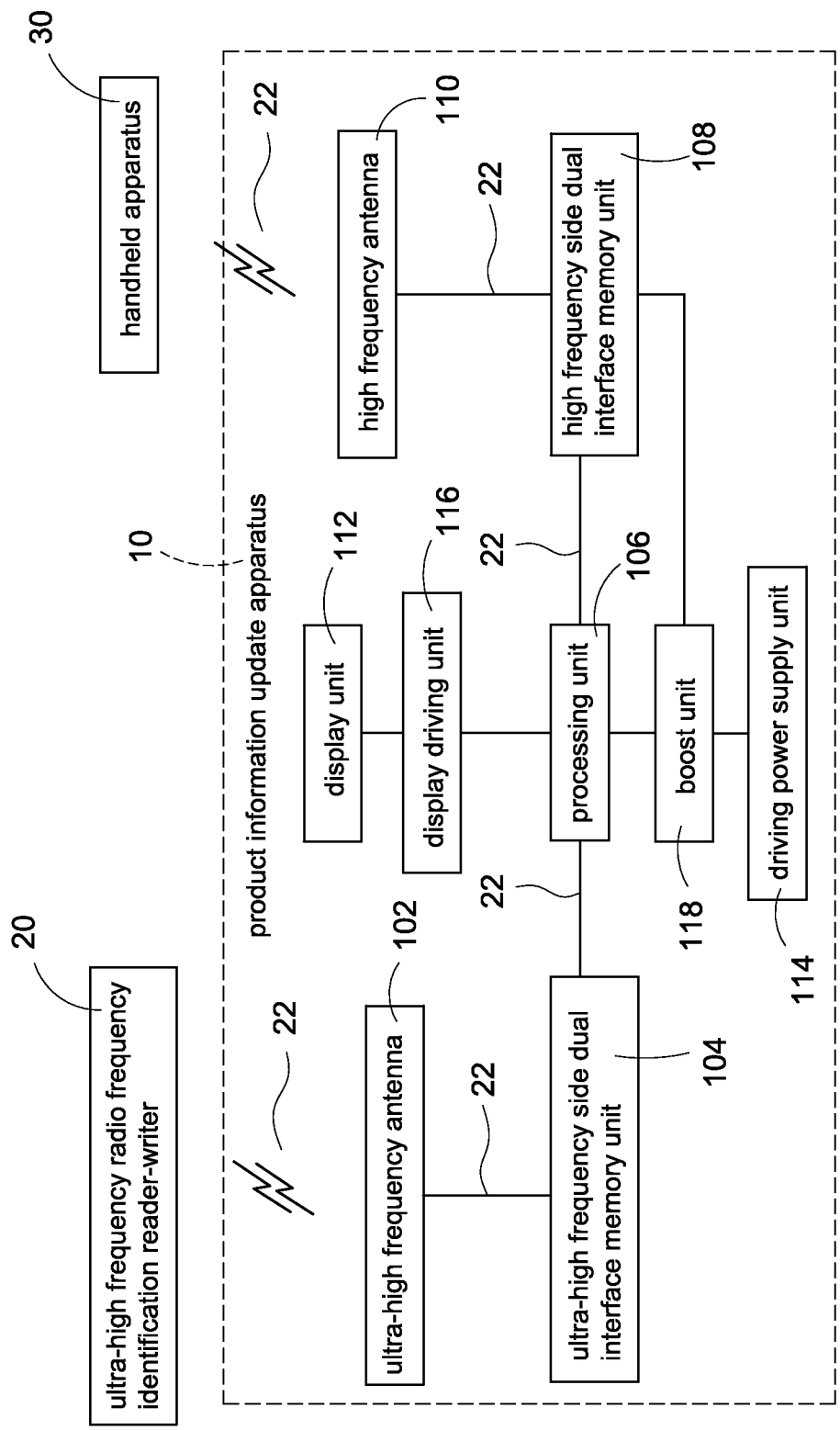
FIG. 3 shows a block diagram of the third embodiment of the product information update apparatus of the present invention.

FIG. 3 shows a block diagram of the third embodiment of the product information update apparatus of the present invention. The description for the elements shown in FIG. 3, which are similar to those shown in FIG. 2, is not repeated here for brevity. Moreover, the product information update apparatus 10 further comprises a display driving unit 116 and a boost unit 118. The display driving unit 116 is electrically connected to the processing unit 106 and the display unit 112. The boost unit 118 is electrically connected to the processing unit 106, the high frequency side dual interface memory unit 108 and the driving power supply unit 114.

The processing unit 106 is configured to control the display driving unit 116 to drive the display unit 112 to update and display the product information signal 22 according to the product information signal 22.

The display driving unit 116 is, for example but not limited to, a dot matrix electrophoretic display driver. The boost unit 118 is, for example but not limited to, a boost circuit. The processing unit 106 is, for example but not limited to, a microprocessor or a microcontroller.

Moreover, a distance between the ultra-high frequency radio frequency identification reader-writer 20 and the ultra-high frequency antenna 102 is about 3 to 5 meters. A frequency band of the ultra-high frequency mentioned above is 860 MHz to 960 MHz. The ultra-high frequency mentioned above is compliant with EPCglobal Class 1 generation 2 and ISO18000-6 (UHF RFID). The high frequency mentioned above is compliant with ISO15693, ISO14443A, ISO14443B and ISO18092 (HF RFID/NFC).

The product information signal 22 is compliant with NDEF (NFC data exchange format). One part of the product information signal 22 is used by consumers in public. The other parts of the product information signal 22 are used by the administrator with passwords.

Figure 4:
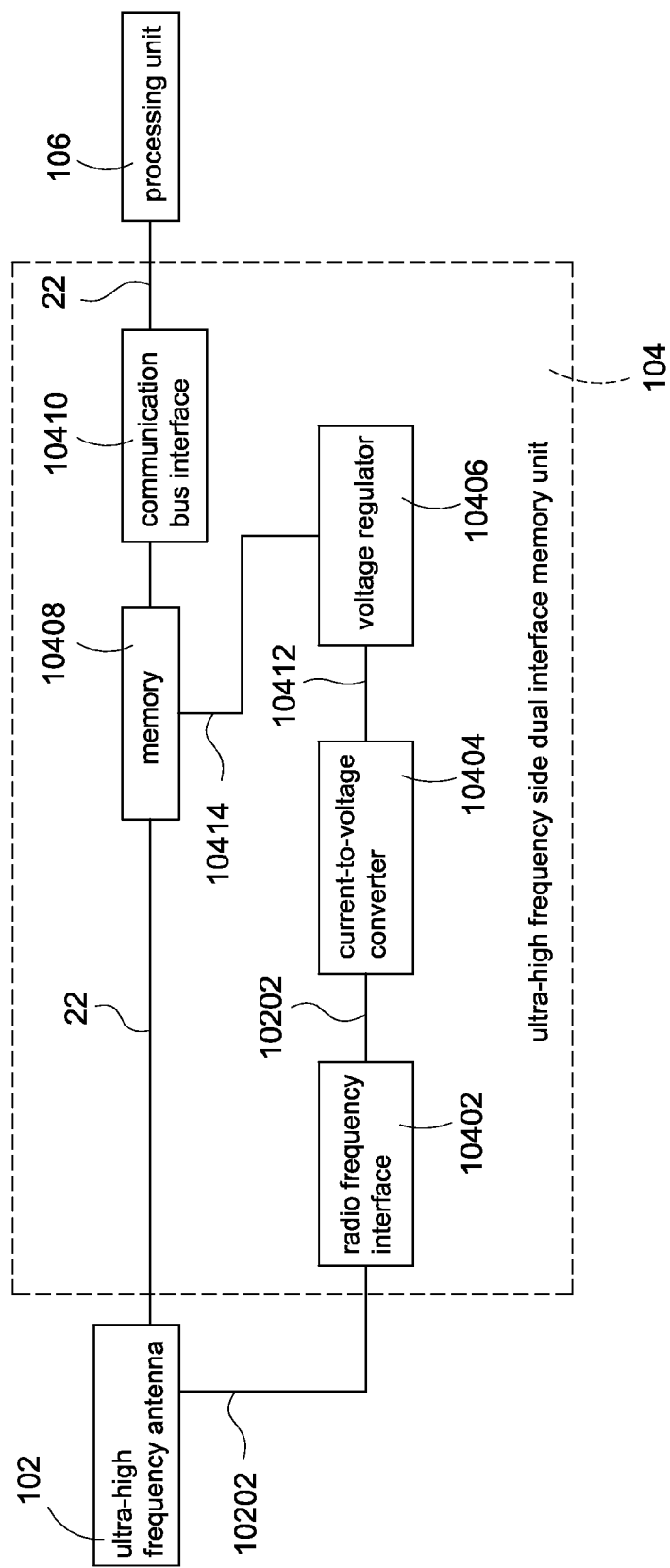
FIG. 4 shows a block diagram of the ultra-high frequency side dual interface memory unit.

FIG. 4 shows a block diagram of the ultra-high frequency side dual interface memory unit. The ultra-high frequency side dual interface memory unit 104 comprises a radio frequency interface 10402, a current-to-voltage converter 10404, a voltage regulator 10406, a memory 10408 and a communication bus interface 10410.

The radio frequency interface 10402 is electrically connected to the ultra-high frequency antenna 102. The current-to-voltage converter 10404 is electrically connected to the radio frequency interface 10402. The voltage regulator 10406 is electrically connected to the current-to-voltage converter 10404. The memory 10408 is electrically connected to the ultra-high frequency antenna 102 and the voltage regulator 10406. The communication bus interface 10410 is electrically connected to the memory 10408 and the processing unit 106.

The ultra-high frequency antenna 102 induces the product information signal 22 into an induced current 10202. The ultra-high frequency antenna 102 sends the induced current 10202 to the radio frequency interface 10402. The radio frequency interface 10402 sends the induced current 10202 to the current-to-voltage converter 10404.

The current-to-voltage converter 10404 converts the induced current 10202 into an induced voltage 10412. The current-to-voltage converter 10404 sends the induced voltage 10412 to the voltage regulator 10406. The voltage regulator 10406 regulates the induced voltage 10412 into a driving voltage 10414. The voltage regulator 10406 sends the driving voltage 10414 to the memory 10408 to drive the memory 10408.

The ultra-high frequency antenna 102 sends the product information signal 22 to the memory 10408. The memory 10408 updates the product data corresponding to the product information signal 22.

The radio frequency interface 10402 is, for example but not limited to, a radio frequency identification interface. The memory 10408 is, for example but not limited to, an electrically erasable programmable read only memory or a ferroelectric random access memory. The communication bus interface 10410 is, for example but not limited to, an inter integrated circuit bus or a serial peripheral interface.

Figure 5:
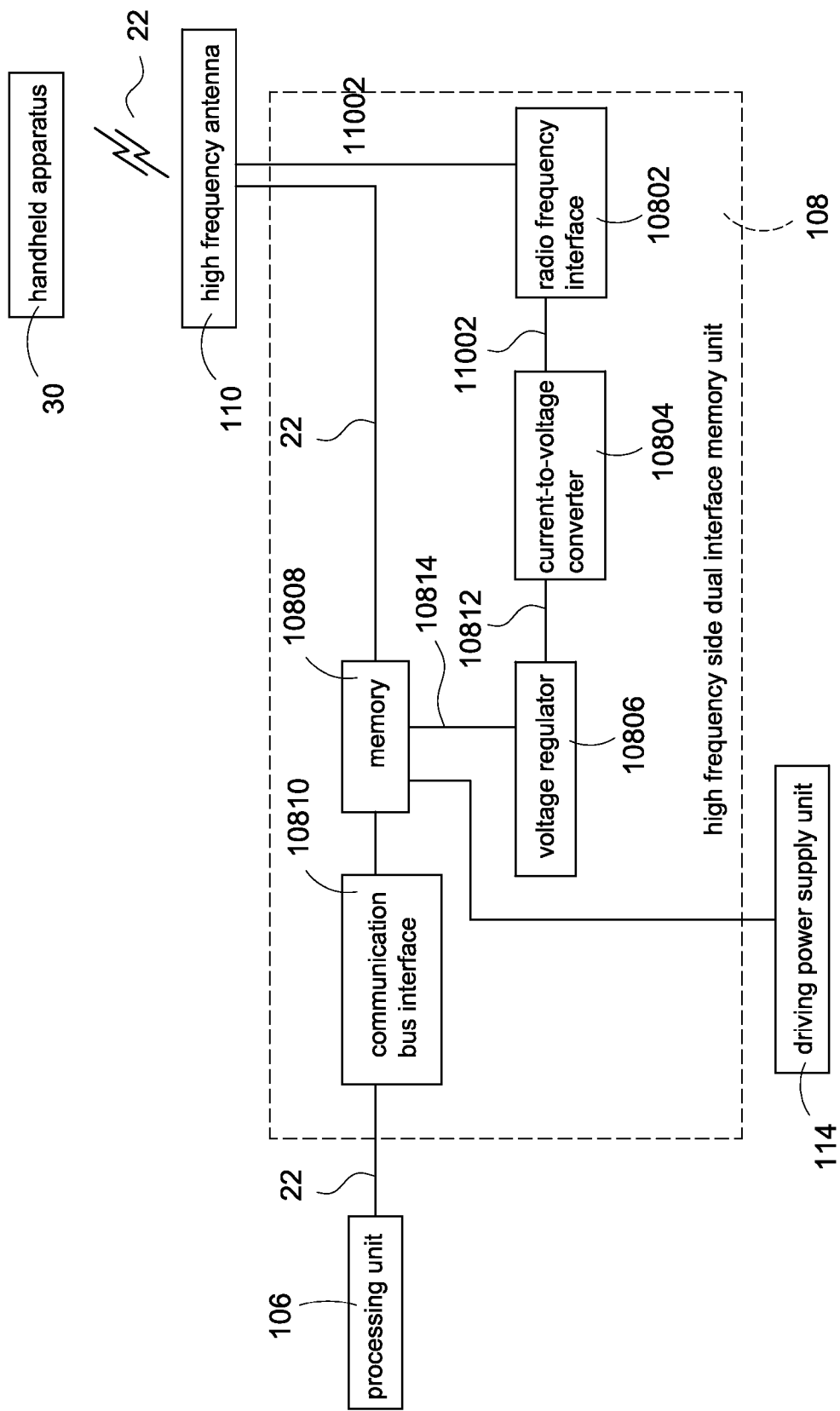
FIG. 5 shows a block diagram of the high frequency side dual interface memory unit.

FIG. 5 shows a block diagram of the high frequency side dual interface memory unit. The high frequency side dual interface memory unit 108 comprises a radio frequency interface 10802, a current-to-voltage converter 10804, a voltage regulator 10806, a memory 10808 and a communication bus interface 10810.

The radio frequency interface 10802 is electrically connected to the high frequency antenna 110. The current-to-voltage converter 10804 is electrically connected to the radio frequency interface 10802. The voltage regulator 10806 is electrically connected to the current-to-voltage converter 10804. The memory 10808 is electrically connected to the high frequency antenna 110, the voltage regulator 10806 and the driving power supply unit 114 (the boost unit 118). The communication bus interface 10810 is electrically connected to the memory 10808 and the processing unit 106.

A distance between the handheld apparatus 30 and the high frequency antenna 110 is about 1 to 15 centimeters. The handheld apparatus 30 is, for example but not limited to, a smart phone or a personal digital assistant. The handheld apparatus 30 wirelessly sends the product information signal 22 to the high frequency antenna 110 (using NFC technology).

The high frequency antenna 110 induces the product information signal 22 into an induced current 11002. The high frequency antenna 110 sends the induced current 11002 to the radio frequency interface 10802. The radio frequency interface 10802 sends the induced current 11002 to the current-to-voltage converter 10804.

The current-to-voltage converter 10804 converts the induced current 11002 into an induced voltage 10812. The current-to-voltage converter 10804 sends the induced voltage 10812 to the voltage regulator 10806. The voltage regulator 10806 regulates the induced voltage 10812 into a driving voltage 10814. The voltage regulator 10806 sends the driving voltage 10814 to the memory 10808 to drive the memory 10808.

The high frequency antenna 110 sends the product information signal 22 to the memory 10808. The memory 10808 updates a product data corresponding to the product information signal 22.

The radio frequency interface 10802 is, for example but not limited to, a radio frequency identification interface. The memory 10808 is, for example but not limited to, an electrically erasable programmable read only memory or a ferroelectric random access memory. The communication bus interface 10810 is, for example but not limited to, an inter integrated circuit bus or a serial peripheral interface.

Moreover, the handheld apparatus 30 receives the product information signal 22 memorized in the memory 10808 through the high frequency antenna 110 (using NFC technology).

The advantage of the present invention is to provide the product information update apparatus, so that updating product information is more easy, convenient and accurate.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A product information update apparatus applied to an ultra-high frequency radio frequency identification reader-writer and a handheld apparatus, the product information update apparatus comprising:
    an ultra-high frequency antenna wirelessly electrically connected to the ultra-high frequency radio frequency identification reader-writer;
    an ultra-high frequency side dual interface memory unit electrically connected to the ultra-high frequency antenna;
    a processing unit electrically connected to the ultra-high frequency side dual interface memory unit;
    a high frequency side dual interface memory unit electrically connected to the processing unit; and
    a high frequency antenna electrically connected to the high frequency side dual interface memory unit and wirelessly electrically connected to the handheld apparatus,
    wherein the ultra-high frequency radio frequency identification reader-writer wirelessly sends a product information signal to the ultra-high frequency antenna; the ultra-high frequency antenna sends the product information signal to the ultra-high frequency side dual interface memory unit; the ultra-high frequency side dual interface memory unit utilizes an energy of the product information signal to update a product data corresponding to the product information signal;
    wherein when the processing unit and the high frequency side dual interface memory unit are driven, the processing unit fetches the product information signal from the ultra-high frequency side dual interface memory unit; the processing unit sends the product information signal to the high frequency side dual interface memory unit; the high frequency side dual interface memory unit updates the product data corresponding to the product information signal.

2. The product information update apparatus in claim 1, further comprising a display unit electrically connected to the processing unit, wherein when the processing unit and the high frequency side dual interface memory unit are driven, the processing unit fetches the product information signal from the high frequency side dual interface memory unit; the processing unit sends the product information signal to the display unit; the display unit displays an updated product data according to the product information signal.

3. The product information update apparatus in claim 2, further comprising a driving power supply unit electrically connected to the processing unit and the high frequency side dual interface memory unit, wherein the driving power supply unit drives the processing unit and the high frequency side dual interface memory unit.

4. The product information update apparatus in claim 3, wherein the display unit is an electrophoretic display.

5. The product information update apparatus in claim 4, wherein the display unit is a dot matrix electrophoretic display.

6. The product information update apparatus in claim 5, wherein the driving power supply unit is a solar energy conversion supply circuit.

7. The product information update apparatus in claim 6, further comprising a display driving unit electrically connected to the processing unit and the display unit, wherein the processing unit is configured to control the display driving unit to drive the display unit to update and display the product information signal according to the product information signal.

8. The product information update apparatus in claim 7, further comprising a boost unit electrically connected to the processing unit, the high frequency side dual interface memory unit and the driving power supply unit.

9. The product information update apparatus in claim 8, wherein the display driving unit is a dot matrix electrophoretic display driver; the boost unit is a boost circuit.

10. The product information update apparatus in claim 9, wherein the processing unit is a microprocessor or a microcontroller.

\* \* \* \* \*